(12) United States Patent
Terayama et al.

(10) Patent No.: US 10,654,485 B2
(45) Date of Patent: May 19, 2020

(54) CONTROLLER FOR VEHICLE AND INFORMATION PROVIDING METHOD

(71) Applicant: Honda Motor Co., Ltd., Tokyo (JP)

(72) Inventors: Yoshito Terayama, Saitama (JP); Xiang Liu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 205 days.

(21) Appl. No.: 15/683,787

(22) Filed: Aug. 23, 2017

(65) Prior Publication Data
US 2018/0057014 A1    Mar. 1, 2018

(30) Foreign Application Priority Data

Aug. 23, 2016    (JP) .................................. 2016-162830

(51) Int. Cl.
| | |
|---|---|
| *G06F 7/00* | (2006.01) |
| *B60W 20/00* | (2016.01) |
| *B60W 30/00* | (2006.01) |
| *B60W 40/10* | (2012.01) |
| *B60W 50/00* | (2006.01) |
| *B60W 10/08* | (2006.01) |
| *B60W 20/10* | (2016.01) |
| *B60W 50/14* | (2020.01) |

(52) U.S. Cl.
CPC ........ *B60W 50/0098* (2013.01); *B60W 10/08* (2013.01); *B60W 20/10* (2013.01); *B60W 50/14* (2013.01); *B60W 2050/146* (2013.01); *B60W 2510/08* (2013.01); *Y02T 10/6221* (2013.01); *Y10S 903/902* (2013.01)

(58) Field of Classification Search
None
See application file for complete search history.

(56) References Cited

U.S. PATENT DOCUMENTS

| | | | |
|---|---|---|---|
| 2014/0046523 A1 | 2/2014 | Lado et al. | |
| 2014/0046526 A1* | 2/2014 | Oikawa | B60K 6/445 701/22 |
| 2014/0297098 A1* | 10/2014 | Yoshimoto | G01M 17/007 701/31.4 |

FOREIGN PATENT DOCUMENTS

| | | |
|---|---|---|
| CN | 103764465 | 4/2014 |
| DE | 102015115500 | 3/2016 |

(Continued)

OTHER PUBLICATIONS

"Office Action of China Counterpart Application", dated Nov. 6, 2019, with English translation thereof, p. 1-p. 12.

*Primary Examiner* — Adam D Tissot
(74) *Attorney, Agent, or Firm* — JCIPRNET (57) ABSTRACT

A controller for a vehicle includes: a control target value deriving unit configured to derive a control target value of an electric motor for travel which is mounted in a vehicle; a reference value deriving unit configured to derive a reference value serving as a reference for providing information to an occupant based on the control target value derived by the control target value deriving unit; a theoretical value deriving unit configured to derive a theoretical value related to an output of the electric motor; a selection unit configured to compare the reference value derived by the reference value deriving unit and the theoretical value derived by the theoretical value deriving unit with each other and to select the value having the smaller absolute value; and a control unit configured to control an information providing device based on the value selected by the selection unit.

7 Claims, 9 Drawing Sheets

(56) References Cited

FOREIGN PATENT DOCUMENTS

| JP | 2013154717 | 8/2013 |
|---|---|---|
| WO | 2012147164 | 11/2012 |
| WO | 2013137298 | 8/2015 |
| WO | 2015156146 | 10/2015 |

\* cited by examiner

| Rotation Speed | Power (Powering) |
|---|---|
| 0 | 0 |
| 500 | +15 |
| 1000 | +30 |
| 1500 | +45 |
| ⋮ | ⋮ |

82B

| Rotation Speed | Power (Regeneration) |
|---|---|
| 0 | 0 |
| 500 | −16 |
| 1000 | −32 |
| 1500 | −48 |
| ⋮ | ⋮ |

|  | Before Time t+4 | Time t+4 ↔ t+5 | After Time t+5 |
|---|---|---|---|
| Embodiment | | | |
| Comparative Example | | | |

CONTROLLER FOR VEHICLE AND INFORMATION PROVIDING METHOD

CROSS-REFERENCE TO RELATED APPLICATION

This application claims the priority benefit of Japan Application no. 2016-162830, filed on Aug. 23, 2016. The entirety of the above-mentioned patent application is hereby incorporated by reference herein and made a part of this specification.

BACKGROUND OF THE INVENTION

Field of the Invention

The present invention relates to a controller for a vehicle and an information providing method.

Description of Related Art

In the related art, a controller for a vehicle that displays a mode (a driving mode or a charging mode) based on a sign of a power output from a hybrid system to an on-board information providing device in response to a torque required by a driver is known (for example, see Patent Document 1). An information providing device that acquires a display value by performing a smoothing process on a control value related to the power is also known (for example, see Patent Document 2).

PRIOR ART DOCUMENT

Patent Documents

[Patent Document 1] WO 2012/147164
[Patent Document 2] Japanese Unexamined Patent Application Publication No. 2013-154717

SUMMARY OF THE INVENTION

However, when a control value related to power is supplied to the information providing device without any change, details of information provided (for example, a needle) may fluctuate drastically and thus an occupant may feel discomfort. When a smoothing process is performed to suppress this fluctuation, the drastic fluctuation of details of the information providing device is suppressed, but a delay in which the vehicle has stopped but non-zero power is displayed occurs, that is, a delay with respect to an actual vehicle condition occurs in a control value provided to the information providing device, and thus an occupant of the vehicle may feel discomfort.

The invention is made in consideration of the above-mentioned circumstances and an object thereof is to prevent an occupant of a vehicle from feeling discomfort.

A first aspect of the invention provides a controller for a vehicle, including: a control target value deriving unit configured to derive a control target value of an electric motor for travel which is mounted in a vehicle; a reference value deriving unit configured to derive a reference value serving as a reference for providing information to an occupant based on the control target value derived by the control target value deriving unit; a theoretical value deriving unit configured to derive a theoretical value related to an output of the electric motor; a selection unit configured to compare the reference value derived by the reference value deriving unit and the theoretical value derived by the theoretical value deriving unit with each other and to select the value having the smaller absolute value; and a control unit configured to control an information providing device based on the value selected by the selection unit.

A second aspect of the invention provides the controller for a vehicle according to the first aspect, wherein, in a predetermined period, the reference value deriving unit does not derive the reference value and the selection unit selects the theoretical value without performing the comparison.

A third aspect of the invention provides the controller for a vehicle according to the second aspect, wherein the predetermined period starts when a state in which the absolute value of the theoretical value is greater than the absolute value of the reference value is changed to a state in which the absolute value of the theoretical value is equal to or less than the absolute value of the reference value.

A fourth aspect of the invention provides the controller for a vehicle according to the third aspect, wherein the predetermined period ends when a predetermined time passes after a vehicle speed of the vehicle becomes zero.

A fifth aspect of the invention provides the controller for a vehicle according to any one of the first to fourth aspects, wherein the theoretical value deriving unit derives the theoretical value based on a rotation speed of the electric motor.

According to a sixth aspect of the invention, there is provided an information providing method including: deriving a control target value of an electric motor for travel which is mounted in a vehicle; deriving a reference value serving as a reference for providing information to an occupant based on the derived control target value; deriving a theoretical value related to an output of the electric motor; comparing the derived reference value and the derived theoretical value with each other and selecting the value having the smaller absolute value; and controlling an information providing device based on the selected value.

A seventh aspect of the invention provides the information providing method according to the sixth aspect, wherein, in a predetermined period, the reference value is not derived and the theoretical value is selected without performing the comparison.

According to the first, fifth, and sixth aspects, since the value having the smaller absolute value of the reference value and the theoretical value is selected and the information providing device is controlled based on the selected value, it is possible to prevent an occupant of the vehicle from feeling discomfort by displaying information interlocking with an actual vehicle condition.

According to the second, third, fourth, and seventh aspects, the reference value deriving unit does not derive the reference value in the predetermined period. As a result, an unnecessary process is omitted and a processing load of the controller for a vehicle is reduced.

DESCRIPTION OF THE EMBODIMENTS

Hereinafter, a vehicle controller and an information providing method according to an embodiment of the invention will be described with reference to the accompanying drawings.

A vehicle controller according to this embodiment is mounted in, for example, a hybrid electrical vehicle (HEV). The HEV includes an electric motor and an internal combustion engine (an engine), and travels with the power of one or both of the electric motor and the engine depending on a driving condition of the vehicle. Hereinafter, a driving mode in which only power output from the electric motor is used is referred to as "motor driving," a driving mode in which only power output from the engine is used is referred to as "engine driving," and a driving mode in which both the power output from the electric motor and the power output from the engine are used is referred to as "engine/motor driving." Examples of a drive system of the HEV include a parallel system, a series system, and a series/parallel system. The vehicle controller according to this embodiment can be applied to the drive systems and can also be mounted in vehicles of various drive systems using an electric motor as a power source. For example, the vehicle controller according to this embodiment may be mounted in an electric vehicle or a fuel-cell vehicle instead of the HEV. In the following description, for example, it is assumed that the vehicle controller is mounted in an HEV with a parallel system.

Figure 1:
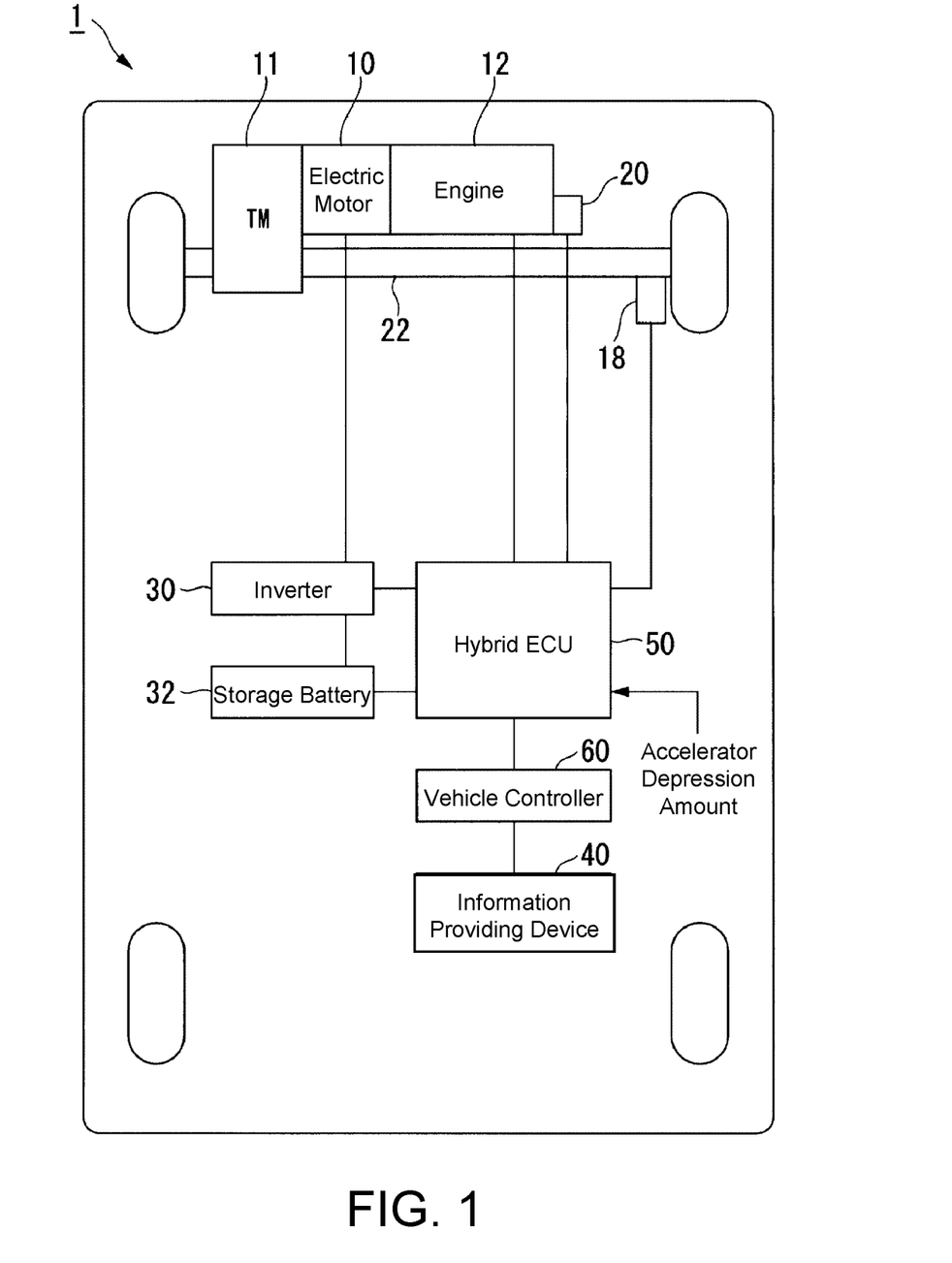
FIG. 1 is a diagram illustrating a configuration of an HEV 1.

FIG. 1 is a diagram illustrating a configuration of a HEV 1. For example, the HEV 1 includes an electric motor 10, a transmission 11, an engine 12, a vehicle speed sensor 18, a crank angle sensor 20, an axle 22, an inverter 30, a storage battery 32, an information providing device 40, a hybrid electronic control unit (ECU) 50, and a vehicle controller 60.

The electric motor 10 generates power (a driving force) for allowing the vehicle to travel. The power of the electric motor 10 is transmitted to the axle 22 via the transmission 11. The electric motor 10 serves as a regenerative power generator during deceleration braking of the HEV 1 and outputs the generated power to the storage battery 32 via the inverter 30. The engine 12 generates power (a driving force) for allowing the HEV 1 to travel. The power of the engine 12 is output to the axle 22 via the transmission 11.

The vehicle speed sensor 18 detects a vehicle speed of the HEV 1 and outputs the detected vehicle speed to the hybrid ECU 50. As a specific configuration of the vehicle speed sensor 18, for example, a structure for detecting and consolidating wheel speeds of four wheels or a structure for detecting a rotation speed of the transmission is employed.

The crank angle sensor 20 detects a rotation angle of the engine 12. The rotation speed of the engine 12 is calculated by the hybrid ECU 50 based on the rotation angle of the engine 12.

The inverter 30 is electrically connected between the electric motor 10 and the storage battery 32. The inverter 30 converts DC power input from the storage battery 32 into AC power and outputs the converted AC power to the electric motor 10, or converts AC power input from the electric motor 10 into DC power and outputs the converted DC power to the storage battery 32. The inverter 30 has a DC-DC converter built therein.

The storage battery 32 stores power output from the inverter 30. The storage battery 32 supplies power to the electric motor 10 and other on-board devices via the inverter 30.

The hybrid ECU 50 controls the electric motor 10, the engine 12, the inverter 30, and the storage battery 32. The hybrid ECU 50 does not comprehensively control all of them but may be a set of a plurality of ECUs which are distributed. The hybrid ECU 50 acquires the vehicle speed detected by the vehicle speed sensor 18, the rotation speed detected by the crank angle sensor 20, the rotation speed of the electric motor 10 detected by a rotation angle sensor such as a resolver which is not illustrated, or a depression amount of an accelerator pedal (an accelerator depression amount AC) which is operated by an occupant (a driver) of the vehicle, or the like. The accelerator depression amount is acquired using an accelerator depression sensor which is not illustrated.

The hybrid ECU 50 derives a required torque Tr which has been requested by a driver and which will be output to the axle 22, for example, based on the accelerator depression amount AC and the vehicle speed V of the HEV 1. The hybrid ECU 50 derives power P to be output to the axle 22 based on the required torque Tr and the rotation speed of the axle 22.

Then, the hybrid ECU 50 determines power to be output from the electric motor 10 and the engine 12 based on Equation (1). As expressed in Equation (1), the hybrid ECU 50 determines power Pe and power Pm such that a sum of power P and power Pany is equal to a sum of the power Pe output from the engine 12 and the power Pm output from the electric motor 10. The power Pany includes power which is output from auxiliary devices mounted in the HEV 1 and power for replenishing an amount of power with which the storage battery 32 needs to be charged. In the following description, it is assumed that positive and negative signs are added to power, and the power is calculated with a powering side as positive and with a regeneration side as negative. When the vehicle controller 60 is applied to a drive system other than the parallel system of the HEV, power to be output from the electric motor 10 and the engine 12 is determined depending on the drive system.

$$P + Pany = Pe + Pm \qquad (1)$$

A method of determining the power Pe and Pm will be described below. The hybrid ECU 50 switches the driving mode depending on the driving conditions (such as starting, low-speed traveling, middle-speed traveling, high-speed traveling, and sudden acceleration). Examples thereof will be described below. The HEV 1 performs motor driving at the time of starting or low-speed traveling. The HEV 1 performs engine driving at the time of middle-speed traveling or high-speed traveling. The HEV 1 performs engine/motor traveling at the time of sudden acceleration. The hybrid ECU 50 distributes the power to be assigned to the electric motor 10 and the engine 12 based on the driving mode at that time. When the engine 12 is driven, the hybrid ECU 50 determines the engine torque Te and the engine rotation speed Ne such that the engine is driven at an operating point having good energy efficiency and outputs or does not output the residual power to the electric motor 10.

Figure 2:
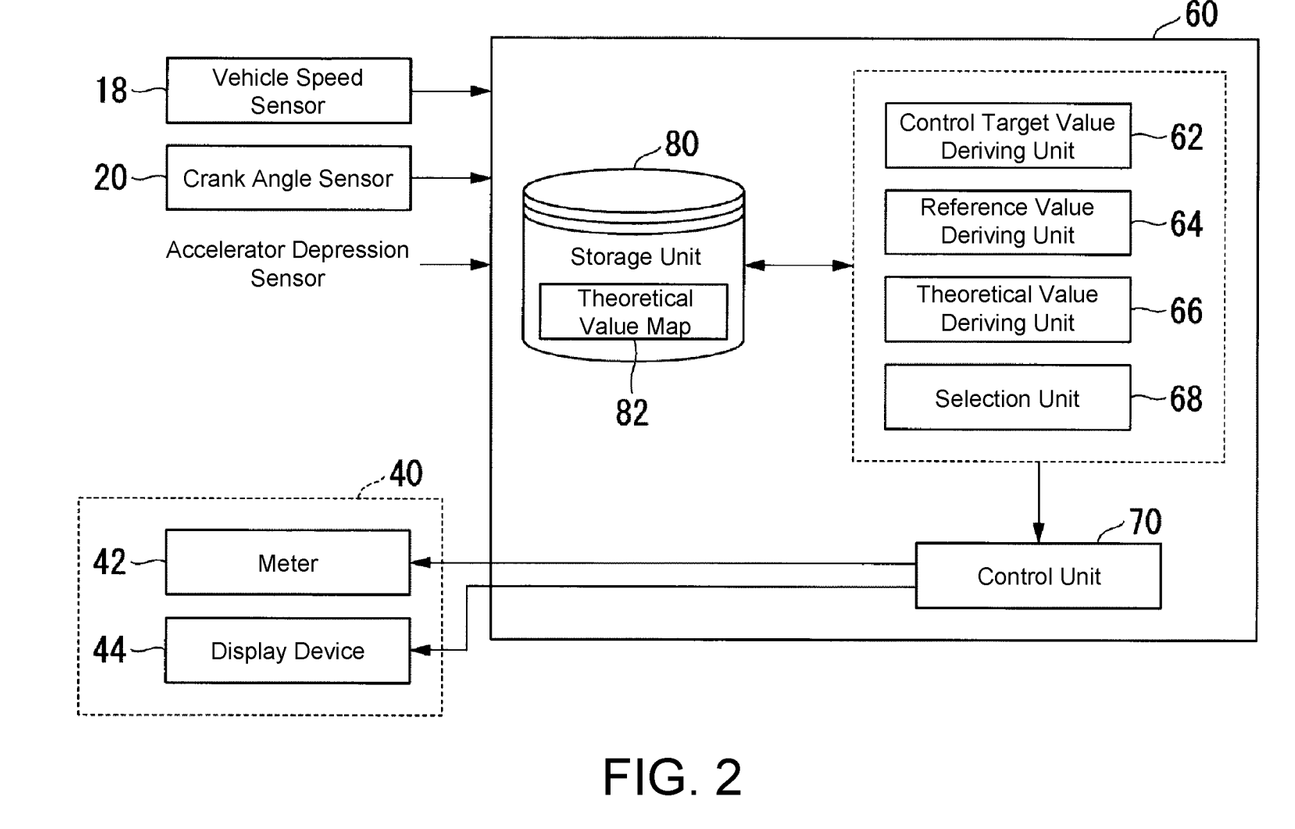
FIG. 2 is a diagram illustrating a functional configuration of a vehicle controller 60.

FIG. 2 is a diagram illustrating a functional configuration of the vehicle controller 60. The vehicle controller 60 includes a control target value deriving unit 62, a reference value deriving unit 64, a theoretical value deriving unit 66, a selection unit 68, a control unit 70, and a storage unit 80.

Some or all of the control target value deriving unit 62, the reference value deriving unit 64, the theoretical value deriving unit 66, the selection unit 68, and the control unit 70 are embodied by causing a processor to execute a program (software). Some or all thereof may be embodied by hardware or may be embodied by a combination of software and hardware. The functional units included in the vehicle controller 60 may be distributed among a plurality of computer devices.

The storage unit 80 is embodied, for example, by a read only memory (ROM), a random access memory (RAM), a hard disk drive (HDD), and a flash memory. A program which is executed by a processor may be stored in advance in the storage unit 80 or may be downloaded from an external device via on-board Internet equipment or the like. The program may be installed in the storage unit 80 by attaching a portable storage medium having the program stored therein to a drive unit which is not illustrated.

The control target value deriving unit 62 derives the power P to be output to the axle 22 by the same technique as in the hybrid ECU 50. The vehicle controller 60 may refer to the processing result of the hybrid ECU 50. In this case, the hybrid ECU 50 serves as the control target value deriving unit 62.

The reference value deriving unit 64 derives smoothed power (a reference value) which is reference for providing information to an occupant based on the power P derived by the control target value deriving unit 62. The reference value deriving unit 64 derives the smoothed power by performing a predetermined arithmetic process on the power P. The predetermined arithmetic process is a process of smoothing a variation of the power P (a smoothing process). The reference value deriving unit 64 performs the smoothing process on the power P using a function such as a preset moving average. A statistical or stochastic technique may be used for the smoothing process instead of the moving average.

The theoretical value deriving unit 66 derives a theoretical value (theoretical power) of the output of the electric motor. The theoretical value is a theoretical power which is derived based on the rotation speed of the electric motor 10 with the power P not subjected to the smoothing process. In this embodiment, the theoretical value is a value based on the assumption that the absolute value of power which is input to and output from the electric motor 10 is a theoretical maximum value in the electric motor 10.

Figure 3:
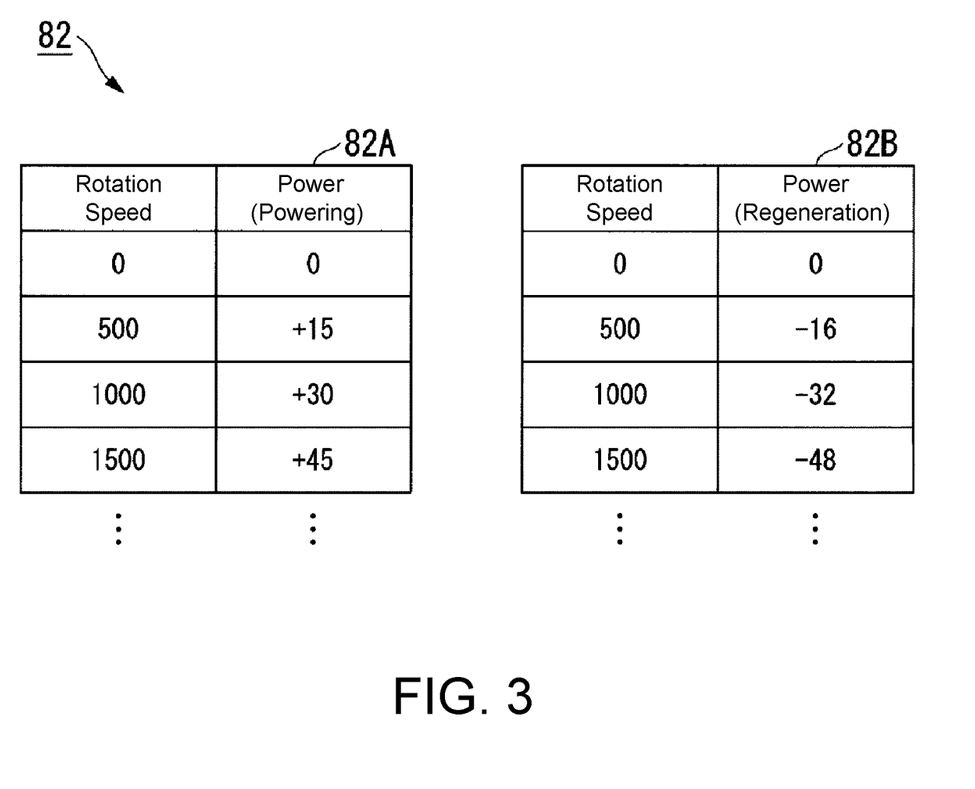
FIG. 3 is a diagram illustrating an example of a theoretical value map 82.

The theoretical value deriving unit 66 derives a theoretical value, for example, based on a theoretical value map 82. FIG. 3 is a diagram illustrating an example of the theoretical value map 82. The theoretical value map 82 includes a powering map 82A which is used for powering of the electric motor 10 and a regeneration map 82B which is used for regeneration of the electric motor 10.

The powering map 82A is information in which the rotation speed of the electric motor 10 at the power P not subjected to the smoothing process is correlated with a theoretical value of the output of the electric motor 10 at the time of powering. The regeneration map 82B is information in which the rotation speed of the electric motor 10 at the power P not subjected to the smoothing process is correlated with a theoretical value of the output of the electric motor 10 at the time of regeneration.

The selection unit 68 selects the smaller of the theoretical value and the smoothed power when the smoothed power is positive, and selects the larger of the theoretical value and the smoothed power when the smoothed power is negative. That is, the selection unit 68 compares the smoothed power derived by the reference value deriving unit 64 and the theoretical value derived by the theoretical value deriving unit 66 and selects the value having the smaller absolute value.

The control unit 70 controls the information providing device 40 based on the value selected by the selection unit 68.

Figure 4:
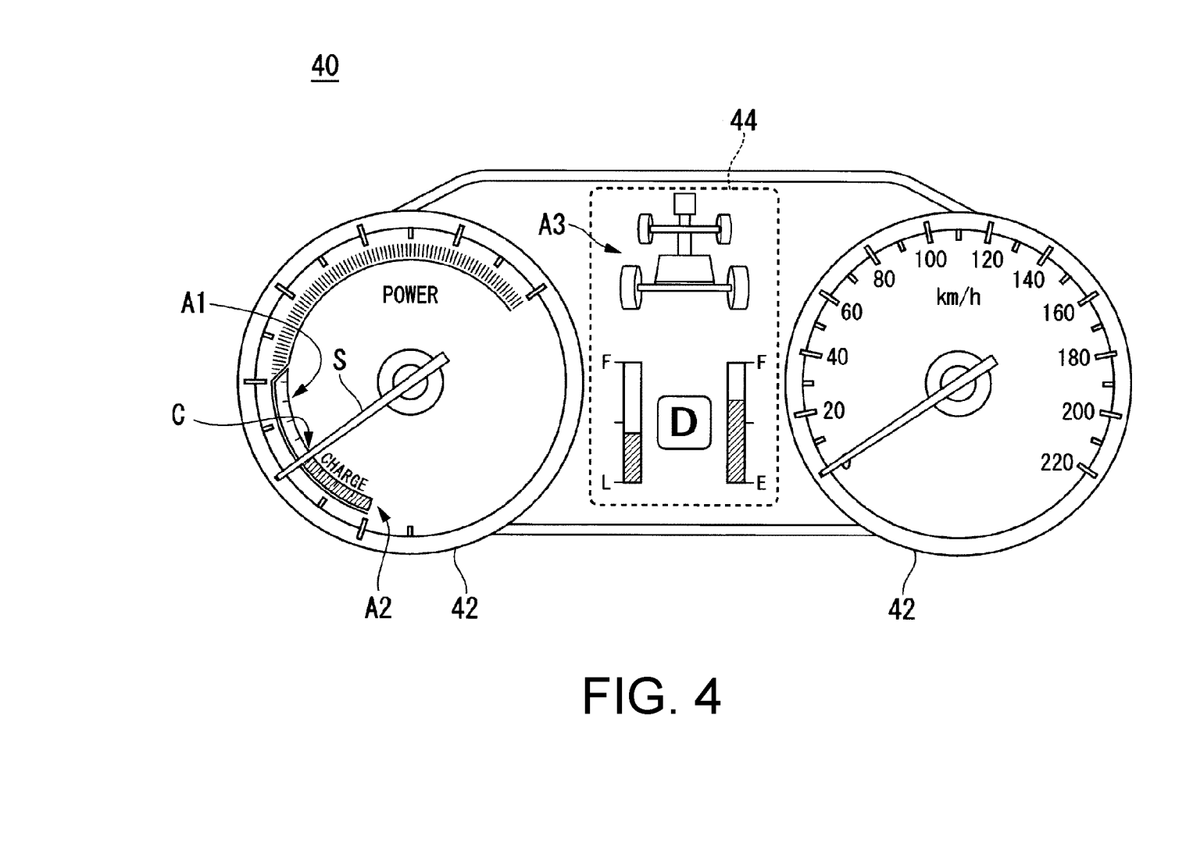
FIG. 4 is a diagram illustrating an example of a meter 42 and a display device 44 which are included in an information providing device 40.

The information providing device 40 provides information indicating the power to an occupant under the control of the control unit 70. FIG. 4 is a diagram illustrating an example of a meter 42 and a display device 44 which are included in the information providing device 40. The meter 42 includes an area A1 in which an index of the power output from the electric motor 10 at the time of powering is displayed and an area A2 in which an index of the power (regenerative electric power) output from the electric motor 10 at the time of regeneration is displayed. A neutral point C which is a boundary between the area A1 and the area A2 indicates zero. The area A1 is an area indicating positive power and the area A2 is an area indicating negative power. The regenerative electric power output from the electric motor 10 is displayed as negative power and the power output from the electric motor 10 to the axle 22 is displayed as positive power. The meter 42 includes an indicator S indicating the power index. When the power output from the electric motor 10 at the time of powering increases, the indicator S is rotationally driven clockwise in the area A1 to indicate an increase of the positive power. When the power output from the electric motor 10 at the time of regeneration increases, the indicator S is rotationally driven counterclockwise in the area A2 to indicate an increase of the negative power (the regenerative electric power).

The display device 44 includes an area A3 in which an energy flow meter is displayed. When the power increases at the time of powering, the energy flow meter in the area A3 performs a first operation. When the power output from the electric motor 10 at the time of regeneration increases, the energy flow meter in the area A3 performs a second operation.

The first operation is an operation of sequentially turning on an indication lamp formed in the vicinity of a display area in which front tires are drawn in the energy flow meter and an indication lamp formed in the vicinity of a display area in which a storage battery is drawn in this order and then repeatedly performing turning off of both indication lamps and sequentially turning on of both indication lamps as described above. The second operation is an operation of turning on the indication lamps in the reverse order of the above-mentioned order of turning on the indication lamps in the first operation and then repeatedly performing turning off of both indication lamps and sequentially turning on of both indication lamps.

Operation During Regeneration

Figure 5:
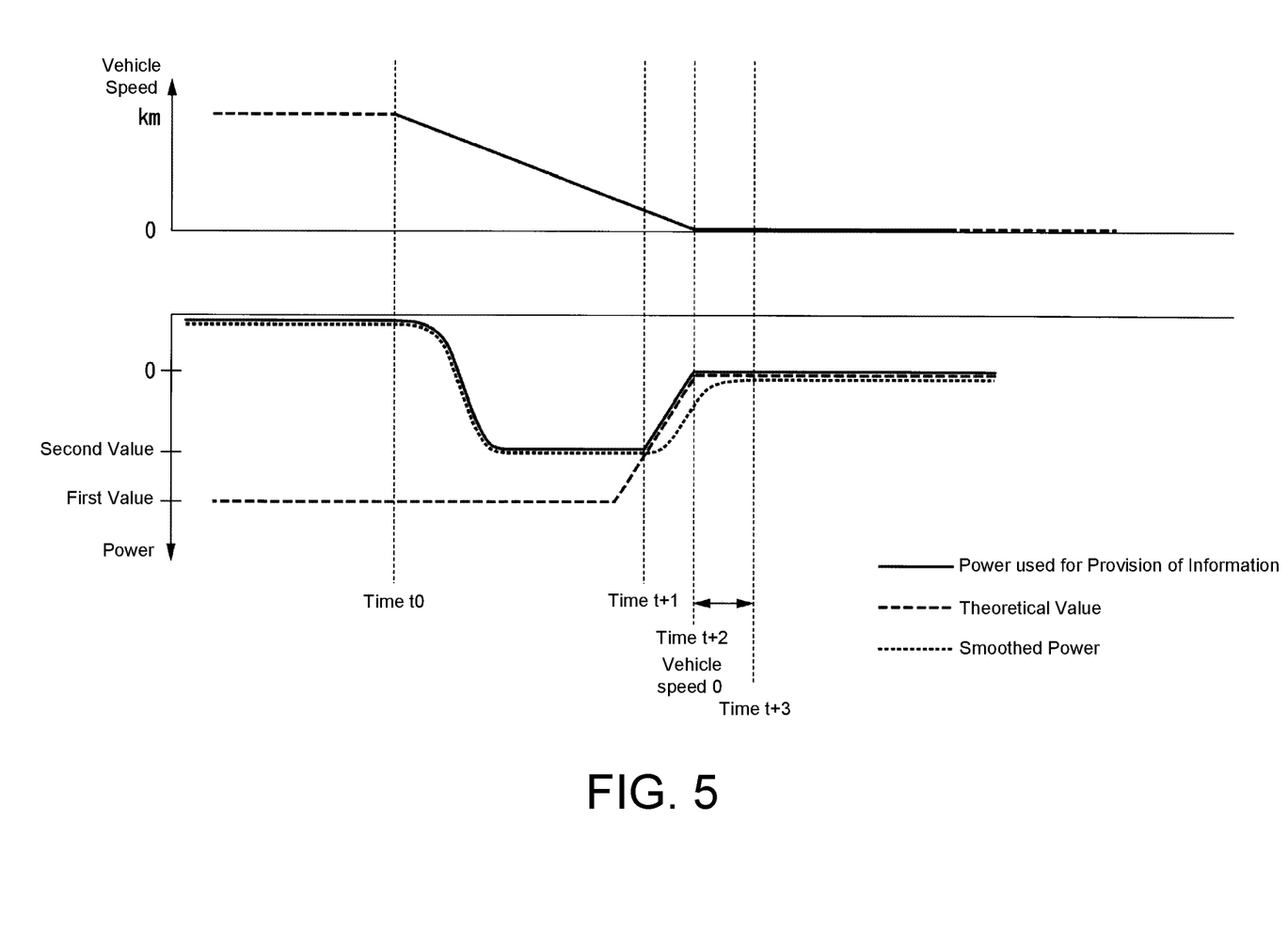
FIG. 5 is a timing chart illustrating timings of processes which are performed by the vehicle controller 60 during regeneration.

FIG. 5 is a timing chart illustrating timings of processes which are performed by the vehicle controller 60 during regeneration. The vertical axis in the upper part of FIG. 5 represents the vehicle speed of the HEV 1 and the vertical axis in the lower part of FIG. 5 represents the theoretical value, the smoothed power, and the power which is used for provision of information. As the output of the regenerative electric power becomes larger, the absolute value of the theoretical value becomes larger.

The vehicle speed will be described below. It is assumed that the HEV 1 starts deceleration at time to, the vehicle speed of the HEV 1 is zero at time t+2, and the vehicle speed of the HEV 1 is maintained at zero subsequent to time t+2. Changes of the values in this case will be described below.

The theoretical value will be described below. The theoretical value is maintained at a first value up to a certain time prior by a predetermined time to time t+1 and the theoretical value varies to increase from the first value with a predetermined slope at the certain time. The theoretical value becomes zero at time t+2 at which the vehicle speed is zero, and the theoretical value is maintained at zero subsequent to time t+2.

The smoothed power will be described below. After time t0, the smoothed power decreases smoothly to a second value with a decrease in the vehicle speed. After time t+1, since the smoothing process is performed, the smoothed power increases smoothly from the second value to zero. After time t+3, the smoothed power reaches zero and then is maintained at zero. In this way, since the vehicle speed is zero at time t+2 but the smoothing process is performed, the smoothed power does not reach zero even at time t+2.

The power which is used for provision of information will be described below. Up to time t+1, the power which is used for provision of information changes in the same way as the smoothed power. This is because the selection unit 68 selects the smoothed power, which has the smaller absolute value of the smoothed power and the theoretical value. Time t+1 is a time at which the theoretical value becomes equal to or less than the smoothed power. After time t+1, the power which is used for provision of information changes in the same way as the theoretical value. This is because the selection unit 68 selects the theoretical value, which has the smaller absolute value of the smoothed power and the theoretical value.

Figure 6:
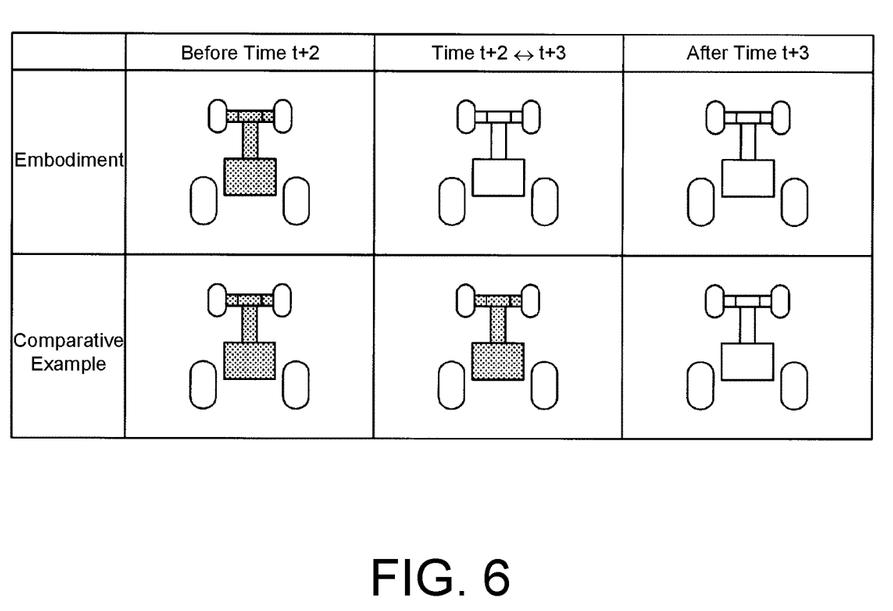
FIG. 6 is a diagram for comparison of a variation of a screen which is displayed by the display device 44 included in the information providing device 40 during regeneration in an embodiment and a comparative example.

FIG. 6 is a diagram for comparison of a variation of a screen which is displayed by the display device 44 included in the information providing device 40 during regeneration in the embodiment and a comparative example. The screen corresponds to the energy flow meter which is displayed in the area A3 in FIG. 4.

The upper part of the drawing indicates a variation of the screen which is displayed by the display device 44 in the embodiment, and the lower part of the drawing indicates a variation of the screen which is displayed by the display device 44 in the comparative example. In the comparative example in which correction (selection) based on the theoretical value is not performed, the smoothed power is displayed without any change and thus the operation of the energy flow meter does not stop after time t+2 at which the vehicle speed reaches zero. On the other hand, in the embodiment in which correction (selection) based on the theoretical value is performed, the smaller value of the theoretical value and the smoothed power is displayed and thus the operation of the energy flow meter stops after time t+2 at which the vehicle speed reaches zero.

In this way, when the vehicle speed is zero, the theoretical value is output to the information providing device 40 as the power which is used for provision of information, and the information providing device 40 can perform accurate provision of information of which details can be easily understood by providing the information to the meter 42 and the display device 44 or one of the meter 42 and the display device 44 depending on the output power. As a result, it is possible to prevent an occupant of the vehicle from feeling discomfort.

For example, when the rotation speed of the electric motor 10 is not acquired, the vehicle controller 60 may provide power previously provided to the information providing device 40, the power when the rotation speed of the electric motor 10 is set to a predetermined value, or zero to the information providing device 40. An example of the case in which the rotation speed of the electric motor 10 is not acquired is a case in which a rotation angle sensor for detecting a rotation angle of the electric motor 10 malfunctions and the detection value of the rotation angle sensor is not output to the vehicle controller 60.

Operation During Powering

Figure 7:
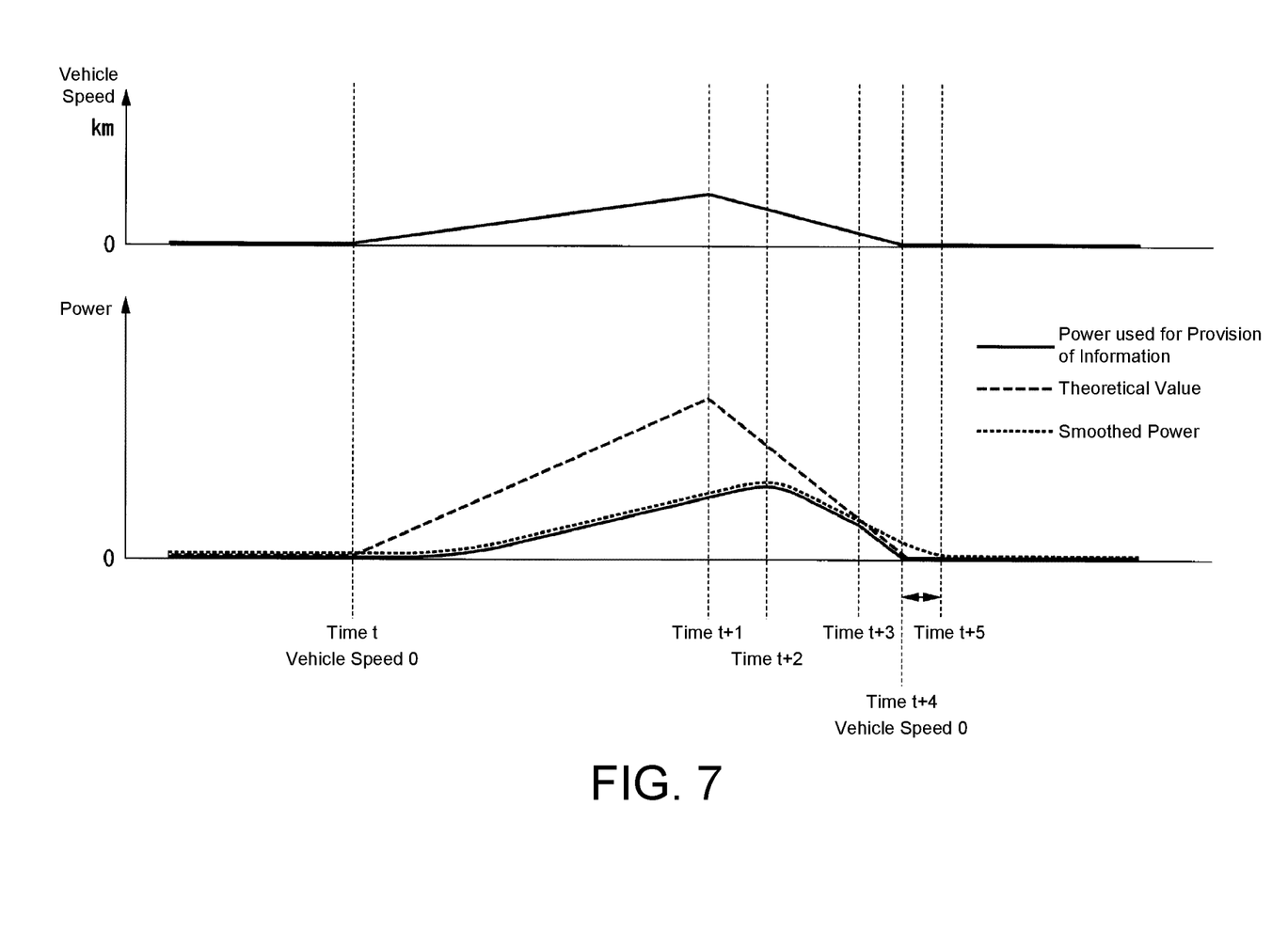
FIG. 7 is a timing chart illustrating timings of processes which are performed by the vehicle controller 60 during power running.

FIG. 7 is a timing chart illustrating timings of the processes which are performed by the vehicle controller 60 during powering. The vertical axis in the upper part of FIG. 7 represents the vehicle speed of the HEV 1 and the vertical axis in the lower part of FIG. 7 represents the theoretical value, the smoothed power, and the power which is used for provision of information.

The vehicle speed will be described below. It is assumed that the HEV 1 starts acceleration at time t0 and the vehicle speed of the HEV 1 reaches a maximum speed at time t+1 and then starts deceleration. It is assumed that the vehicle speed of the HEV 1 reaches zero subsequent to time t+4 and the vehicle speed is maintained at zero subsequent to time t+4. Changes of the values in this case will be described below.

The theoretical value will be described below. The theoretical value starts increasing at time t0, reaches a maximum value at time t+1, and then decreases. The theoretical value becomes zero at time t+4 and the theoretical value is maintained at zero subsequent to time t+4.

The smoothed power will be described below. After time to, the smoothed power increases smoothly with an increase in the vehicle speed. The smoothed power reaches a maximum value at time t+2 and then decreases. At time t+5, the smoothed power reaches zero. In this way, since the vehicle speed is zero at time t+4 but the smoothing process is performed, the smoothed power does not reach zero even at time t+4.

The power which is used for provision of information will be described below. From time t0 to time t+3, the power which is used for provision of information changes in the same way as the smoothed power. This is because the selection unit 68 selects the smoothed power, which has the smaller absolute value of the smoothed power and the theoretical value. Time t+3 is a time at which the theoretical value becomes equal to or less than the smoothed power. After time t+3, the power which is used for provision of information changes in the same way as the theoretical value. This is because the selection unit 68 selects the theoretical value, which has the smaller absolute value of the smoothed power and the theoretical value.

Figure 8:
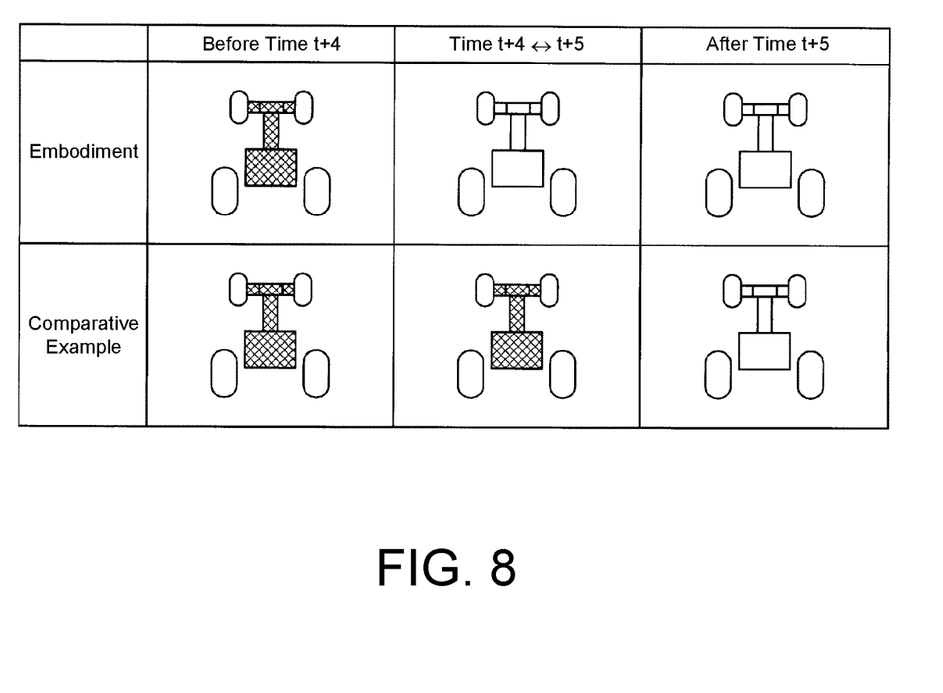
FIG. 8 is a diagram for comparison of a variation of a screen which is displayed by the display device 44 included in the information providing device 40 during power running in the embodiment and the comparative example.

FIG. 8 is a diagram for comparison of a variation of a screen which is displayed by the display device 44 included in the information providing device 40 during powering in the embodiment and a comparative example. The screen corresponds to the energy flow meter which is displayed in the area A3 in FIG. 4.

The upper part of the drawing indicates a variation of the screen which is displayed by the display device 44 in the embodiment, and the lower part of the drawing indicates a variation of the screen which is displayed by the display device 44 in the comparative example. In the comparative example in which correction (selection) based on the theoretical value is not performed, the smoothed power is displayed without any change and thus the operation of the energy flow meter does not stop after time t+4 at which the vehicle speed reaches zero. On the other hand, in the embodiment in which correction (selection) based on the theoretical value is performed, the smaller value of the theoretical value and the smoothed power is displayed and thus the operation of the energy flow meter stops after time t+4 at which the vehicle speed reaches zero.

In this way, when the vehicle speed is zero, the theoretical value is output to the information providing device 40 as the power which is used for provision of information, and the information providing device 40 can perform accurate provision of information of which details can be easily understood by providing the information to the meter 42 and the display device 44 or one of the meter 42 and the display device 44 depending on the output power. As a result, it is possible to prevent an occupant of the vehicle from feeling discomfort.

In the timing charts illustrated in FIGS. 5 and 7, the process of deriving the smoothed power may be omitted in a predetermined period. In this case, the selection unit 68 does not compare the smoothed power with the theoretical value but selects the theoretical value. The predetermined period starts when the state in which the absolute value of the theoretical value is greater than the absolute value of the smoothed power (the reference value) is changed to the state in which the absolute value of the theoretical value is equal to or less than the absolute value of the reference value (at time t+1 in FIG. 5 and time t+3 in FIG. 7). The predetermined period ends after a predetermined time elapses (time t+3 in FIG. 5 and time t+5 in FIG. 7) from the time at which the vehicle speed V becomes zero.

Figure 9:
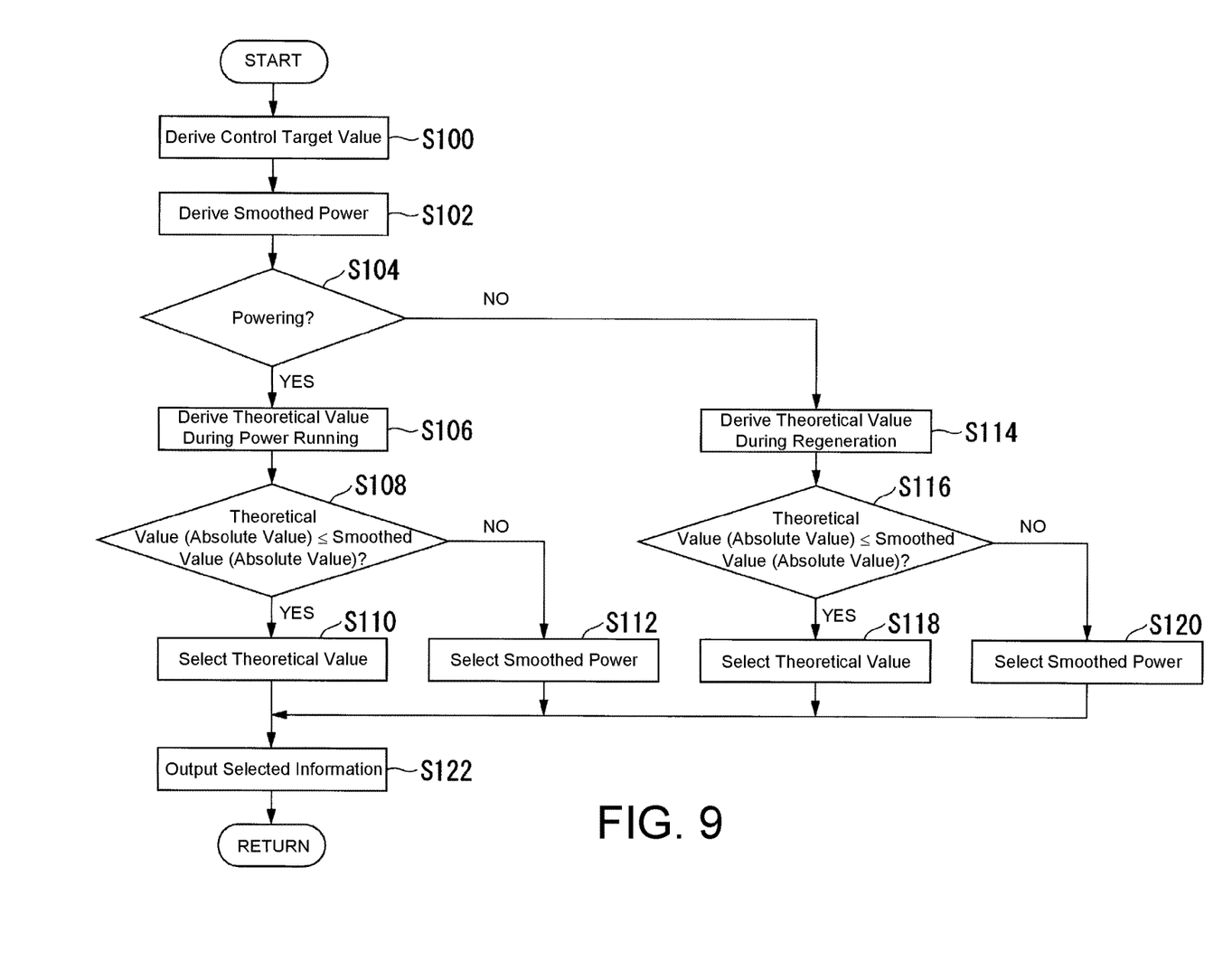
FIG. 9 is a flowchart illustrating a process flow which is performed by the vehicle controller 60.

FIG. 9 is a flowchart illustrating a process flow which is performed by the vehicle controller 60. First, the control target value deriving unit 62 derives a control target value (a power) of the electric motor 10 (Step S100). Then, the reference value deriving unit 64 derives smoothed power based on the control target value derived by the control target value deriving unit 62 (Step S102). Then, the vehicle controller 60 determines whether the electric motor 10 is driven for powering (Step S104).

When the electric motor 10 is driven for powering, the theoretical value deriving unit 66 derives the theoretical value of the output of the electric motor 10 at the time of powering using the powering map 82A (Step S106). Then, the selection unit 68 determines whether the absolute value of the theoretical value derived by the theoretical value deriving unit 66 is equal to or less than the absolute value of the smoothed power derived by the reference value deriving unit 64 (Step S108).

When the absolute value of the theoretical value is equal to or less than the absolute value of the smoothed power, the selection unit 68 selects the theoretical value (Step S110). When the absolute value of the theoretical value is not equal to or less than the absolute value of the smoothed power, the selection unit 68 selects the smoothed power (Step S112).

When the electric motor 10 is driven for regeneration (when the electric motor 10 is not driven for powering), the theoretical value deriving unit 66 derives the theoretical value of the output of the electric motor 10 at the time of regeneration using the regeneration map 82B (Step S114). Then, the selection unit 68 determines whether the absolute value of the theoretical value derived by the theoretical value deriving unit 66 is equal to or less than the absolute value of the smoothed power derived by the reference value deriving unit 64 (Step S116).

When the absolute value of the theoretical value is equal to or less than the absolute value of the smoothed power, the selection unit 68 selects the theoretical value (Step S118). When the theoretical value is not equal to or less than the absolute value of the smoothed power, the selection unit 68 selects the smoothed power (Step S120).

Then, the control unit 70 outputs the theoretical value or the smoothed power selected by the selection unit 68 as the power which is used for provision of information to the information providing device 40 (Step S122). Accordingly, the process flow ends.

This embodiment describes an example in which the control unit 70 controls the information providing device 40 based on information on the power selected by the selection unit 68, but the control unit 70 may control the information providing device 40 based on information on the torque output from the electric motor 10 instead of the information on the power. In this case, the vehicle controller 60 includes a control target value deriving unit that derives a torque which is a control target value of the electric motor 10 for traveling which is mounted in the vehicle, a reference value deriving unit that derives a reference torque which is a reference for providing information to an occupant based on the torque derived by the control target value deriving unit, a theoretical value deriving unit that derives a theoretical torque of the output of the electric motor 10, and a selection unit that compares the theoretical torque derived by the theoretical value deriving unit with the reference torque derived by the reference value deriving unit and selects the torque having the smaller absolute value.

According to the above-mentioned embodiment, it is possible to perform accurate provision of information of which details can be easily understood by causing the selection unit 68 to select the value having the smaller absolute value of the reference value and the theoretical value and causing the control unit 70 to control the information providing device 40 based on the value selected by the selection unit 68. As a result, it is possible to prevent an occupant of the vehicle from feeling discomfort.

While embodiments of the invention have been described, the invention is not limited to the embodiments and can be subjected to various modifications and replacements without departing from the gist of the invention.

What is claimed is:

1. A controller for a vehicle, comprising:
 a control target value deriving unit configured to derive a control target value of an electric motor for travel which is mounted in a vehicle;
 a reference value deriving unit configured to derive a reference value serving as a reference for providing information to an occupant based on the control target value derived by the control target value deriving unit;
 a theoretical value deriving unit configured to derive a theoretical value related to an output of the electric motor;
 a selection unit configured to compare the reference value derived by the reference value deriving unit and the theoretical value derived by the theoretical value deriving unit with each other and to select the value having the smaller absolute value,
 wherein, in a predetermined period, the reference value deriving unit does not derive the reference value, and the selection unit selects the theoretical value without performing the comparison; and a control unit configured to control an information providing device based on the value selected by the selection unit.

2. The controller for a vehicle according to claim 1, wherein the predetermined period starts when a state in which the absolute value of the theoretical value is greater than the absolute value of the reference value is changed to a state in which the absolute value of the theoretical value is equal to or less than the absolute value of the reference value.

3. The controller for a vehicle according to claim 2, wherein the predetermined period ends when a predetermined time passes after a vehicle speed of the vehicle becomes zero.

4. The controller for a vehicle according to claim 1, wherein the theoretical value deriving unit derives the theoretical value based on a rotation speed of the electric motor.

5. The controller for a vehicle according to claim 2, wherein the theoretical value deriving unit derives the theoretical value based on a rotation speed of the electric motor.

6. The controller for a vehicle according to claim 3, wherein the theoretical value deriving unit derives the theoretical value based on a rotation speed of the electric motor.

7. An information providing method comprising:
    deriving a control target value of an electric motor for travel which is mounted in a vehicle;
    deriving a reference value for providing information to an occupant based on the derived control target value;
    deriving a theoretical value related to an output of the electric motor;
    comparing the derived reference value and the derived theoretical value with each other and selecting the value having the smaller absolute value,
    wherein, in a predetermined period, the reference value is not derived, and the theoretical value is selected without performing the comparison; and
    controlling an information providing device based on the selected value.

* * * * *